United States Patent [19]

Davey et al.

[11] Patent Number: 4,852,978
[45] Date of Patent: Aug. 1, 1989

[54] LIQUID CRYSTAL CELL UTILIZING A FERROELECTRIC LIQUID CRYSTAL HAVING A NATURAL PITCH LENGTH IS NO LONGER THAN THE LONGEST WAVELENGTH OF VISIBLE LIGHT

[75] Inventors: Anthony B. Davey; Matthew F. Bone, both of Bishop's Stortford, Great Britain

[73] Assignee: STC PLC, London, England

[21] Appl. No.: 65,918

[22] Filed: Jun. 23, 1987

[30] Foreign Application Priority Data

Jul. 2, 1986 [GB] United Kingdom ............... 8616165

[51] Int. Cl.⁴ .................. G02F 1/13; C09K 19/30
[52] U.S. Cl. .......................... 350/350 R; 350/350 S; 252/299.63
[58] Field of Search ................ 350/350 S, 350 R; 252/299.63, 299.65

[56] References Cited

U.S. PATENT DOCUMENTS 4,662,721  5/1987  Harada et al. ............... 350/339 R
4,702,558 10/1987  Coles et al. ............... 350/350 S X
4,744,639  5/1988  Tsuboyama ................. 350/350 S
4,747,671  5/1988  Takakashi et al. .......... 350/350 S

FOREIGN PATENT DOCUMENTS 0094432  3/1982  European Pat. Off. .
0008816  6/1985  European Pat. Off. .
2166256  1/1980  United Kingdom .
86/02938 5/1986  World Int. Prop. O. ....... 350/350 S

OTHER PUBLICATIONS

Goodby et al. "Helical Twist Sense and Spontaneous Polarization Direction in Ferroelectric Smectic Liquid Crystal" J. Am. Chem. Soc. 8/1986 vol. 108, pp. 4729–4735.

Aftergut et al. "Decay time of twist cells with liquid crystals of shortened pitch" Appl. Phys. Letters, vol. 30, No. 8, 4/15/77.

Physical Review A, vol. 28, No. 1, Jul. 1983. P. E. Cladis et al, "Soliton Switch in Chiral Smectic Liquid Crystals".

Japanese Journal of Applied Physics, vol. 23, No. 6, Jun. 1984. K. Yoshino et al, "New Electro-Optic Effect of Microsecond Response Utilizing Transient Light Scattering in Ferroelectric Crystal".

Primary Examiner—Stanley D. Miller
Assistant Examiner—Huy Kim Mai
Attorney, Agent, or Firm—Lee & Smith

[57] ABSTRACT

Bistable switching between clear and scattering states is provided by a liquid crystal cell whose liquid crystal layer is constituted by a random orientation planar aligned ferroelectric smectic exhibiting a pitch length comparable with the wavelength of visible light.

8 Claims, 1 Drawing Sheet

4,852,978

LIQUID CRYSTAL CELL UTILIZING A FERROELECTRIC LIQUID CRYSTAL HAVING A NATURAL PITCH LENGTH IS NO LONGER THAN THE LONGEST WAVELENGTH OF VISIBLE LIGHT

BACKGROUND OF THE INVENTION

This invention relates to liquid crystal cells and in particular to cells with ferroelectric liquid crystal fillings.

Liquid crystals have been employed in a number of different modes for producing display effects. These modes may be divided into two classes; field effect modes, and modes involving electrohydrodynamic instability. Electrohydrodynamic instability produces a scattering texture, and is essentially volatile insofar as the instability ceases when the electrical drive is removed. However bistable effects can be produced when using a smectic A material by terminating the drive in a way that causes the liquid crystal to relax into an optical scattering focal-conic static state. Field effect mode liquid crystal displays are typically not of light scattering type, but rely upon changes of optical propagation through the liquids that are revealed to the eye with the aid of polarisers. An example of an exception to this general rule is provided by the scattering type field effect mode described in Patent Specification No. 1,543,599. A significant advantage of field effect mode displays over electrodynamic mode lies in the smaller currents involved, and the attendant easing of the problems of electrochemical degradation.

SUMMARY OF THE INVENTION

The present invention is concerned with a scattering mode type liquid crystal cell that, like the mode described in patent specification No. 1,543,599, does not rely upon inducing electrodynamic effects to produce scattering, but, unlike the volatile field effect mode of that patent specification, exhibits either true bistability, or a quasi-stable state that has a long relaxation period.

According to the present invention there is provided a liquid crystal cell switchable between an optically clear state that is stable, or is quasi-stable having a relaxation period in excess of 1 second, and an optically scattering stable state, wherein the active medium of the cell is provided by a layer of ferroelectric liquid crystal material whose natural pitch length is comparable with the wavelength of visible light, which layer is confined by surfaces that promote planar alignment of the liquid crystal molecules at the major surfaces of the liquid crystal layer.

BRIEF DESCRIPTION OF THE DRAWINGS

There follows a description of a liquid crystal cell embodying the present invention in a preferred form.

The description refers to the accompanying drawing which is a schematic perspective view of the cell.

DETAILED DESCRIPTION OF THE PREFERRED EMBODIMENT

Figure 1:
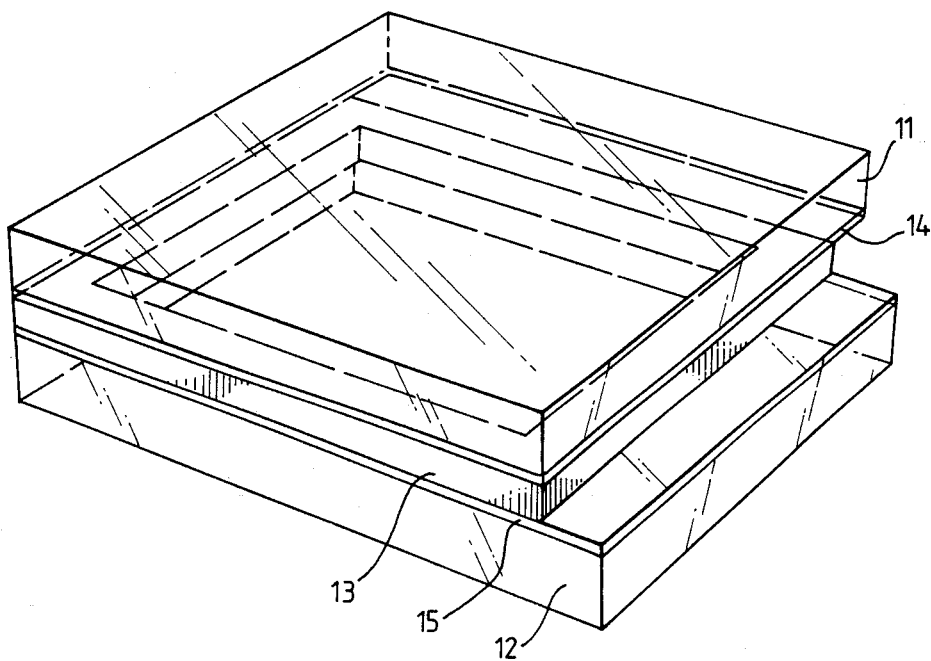

Referring to the accompanying drawing, a hermetically sealed envelope for a liquid crystal layer is formed by securing together two glass sheets 11 and 12 with a perimeter seal 13. The inward facing surfaces of the two sheets carry transparent electrode layers 14 and 15 of indium tin oxide, and each of these electrode layers is covered within the display area with surface layer (not shown) to induce homogeneous alignment of the liquid crystal molecules in contact with that layer. Preferably the surface layer is such as to promote randomly oriented planar alignment, and may be for instance a dialkoxy silane such as $(C_5H_{11})Si(O(C_2H_5))_2$, or an unrubbed polymerlayer, for instance of nylon PET or PVA.

Planar alignment in a chosen direction can be employed but generally it is preferred to employ randomly oriented planar alignment because its scattering power is not dependent upon azimuth.

Before applying the planar alignment inducing surface layers, the electrode layers 14 and 15 are patterned as required to produce the requisite display shapes. In the case of a matrix addressed display each electrode layer is patterned to define a set of strip electrodes (not shown) that individually extend across the display area, and on out to beyond the perimeter seal to provide contact areas to which terminal connection can be made.

In the assembled cell the electrode strips of layer 14 extend transversely of those of layer 15 so as to define a pixel at each elemental area where an electrode strip of layer 15 is overlapped by a strip of layer 14. The thickness of the liquid crystal layer contained within the resulting envelope is determined by the thickness of the perimeter seal, and control over the precision of this may be provided by a light scattering of short lengths of glass fibre (not shown) of uniform diameter distributed through the material of the perimeter seal. Conveniently the cell is filled by applying a vacuum to an aperture (not shown) through one of the glass sheets in one corner of the area enclosed by the perimeter seal so as to cause the liquid crystal medium to enter the cell by way of a second aperture (not shown) in the diagonally opposite corner. The filling operation is carried out with the liquid crystal filling compound heated into its isotropic phase so as to reduce its viscosity to a suitably low value. Subsequent to the filling operation the two apertures are sealed. Typically the thickness of the perimeter seal 13, and hence of the liquid crystal layer is about 5 microns, but thinner or thicker layer thicknesses may be required to suit particular applications.

An example of a suitable ferroelectric liquid crystal filling compound for the cell is provided by the chiral ester S-ethyl 2-(4-nonyloxy-4'-biphenyloyloxy 1"-phenyl-4" carboxyloxy) propanoate

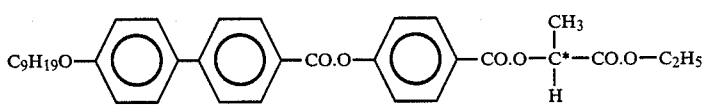

or for instance the octyloxy homologue instead of the nonyloxy one. In the smectic C* phase these materials exhibit a helical pitch of about 0.3 to 0.5 microns which is significantly shorter than that of many of the previously reported materials exhibiting a smectic C* phase such as for instance the chiral ester marketed by BDH under the designation CE8, or DOBAMBC which typically have pitch lengths of about 3 microns. It is believed that it is the short pitch length, being comparable with the wavelength of visible light that is capable of giving rise to the selective reflection of light and thus to the appearance of a light-scattering texture.

After the cell has been filled it is cooled at a relatively rapid rate typically of the order 10° C./min in order to produce a domain structure with domains small compared with 1 mm². Thus structure is light scattering in the visible wavelength range. (Slower cooling at a rate in the region cf only 0.2° C./min produces domains of about 1 min² in area and in consequence a much impaired scattering texture).

In a series of tests made on a sample cell with a square wave voltage applied to the set of electrode 14, while the other set of electrodes (set of electrodes 15) were maintained at the mid-voltage level of the square wave, it was found that, with a 5 KHz square wave, the first sign of the beginning of the disappearance of the scattering state occurred with a peak to peak voltage of about 14 volts, and that by the time this voltage had increased to about 20 volts the scattering texture had disappeared completely. Corresponding figures for a 2 KHz square wave are respectively 6.8 volts and 12 volts, while those for a 1 KHz square wave are 3.2 volts and 6.4 volts.

If the liquid crystal layer is of the appropriate thickness, which typically lies in the range from about 5 um to about 12 um, a pixel will be switched into the clear state by the application of a single pulse, and will remain there substantially indefinitely. In the case of a somewhat thicker cell complete bistability is not observed, and instead the pixel will remain clear for a second or more before relaxation back into the scattering state becomes noticeable. At still greater thicknesses the relaxation becomes faster.

If however the voltage switching the pixel into the clear state is not terminating abruptly, but instead is slowly wound down, as for instance by twisting the knob of a rotary type rheostat, then, as the voltage is reduced, it will at some point revert to the scattering state in the course of the winding down operation.

By way of further example tests were also performed on a three-component mixture comprising :

cyano-compound was smaller than that of the others to avoid solubility problems. The $S_C$-$S_A$ transition temperature was 82.6° C. and the $S_A$-Isotropic transition temperature was 131° C.

We claim:

1. A liquid crystal cell switchable between an optically clear state that is stable, or is quasi-stable having a relaxation period in excess of one second, and an optically scattering stable state, wherein the active medium of said cell is provided by a layer of ferroelectric liquid crystal material whose natural pitch length is in the range defined by the wavelength range of visible light, which layer is confined by surfaces that promote planar alignment of the liquid crystal molecules at the major surfaces of the liquid crystal layer.

2. A liquid crystal cell as claimed in claim 1, wherein the surfaces that confine the liquid crystal layer promote randomly oriented planar alignment at its major surfaces.

3. A liquid crystal cell as claimed in claim 1 wherein the thickness of the liquid crystal layer is greater than the natural pitch length of the material of that layer.

4. A liquid crystal cell as claimed in claim 3 wherein the surfaces that confine the liquid crystal layer promote randomly oriented planar alignment at its major surfaces.

5. A liquid crystal cell switchable between an optically clear state that is stable, or is quasi-stable having a relaxation period in excess of 1 second, and an optically scattering stable state, wherein the active medium of said cell is provided by a layer of ferroelectric liquid crystal material whose natural pitch length is no longer than the longest wavelength of visible light, which layer is confined by surfaces that promote planar alignment of the liquid crystal molecules at the major surfaces of the liquid crystal layer.

6. A liquid crystal cell as claimed in claim 5 wherein the surfaces that confine the liquid crystal layer promote randomly oriented planar alignment at its major surfaces.

7. A liquid crystal cell as claimed in claim 6 wherein the thickness of the liquid crystal layer is greater than the natural pitch length of the material of that layer.

8. A liquid crystal cell as claimed in claim 7 wherein the surfaces that confine the liquid crystal layer pro-

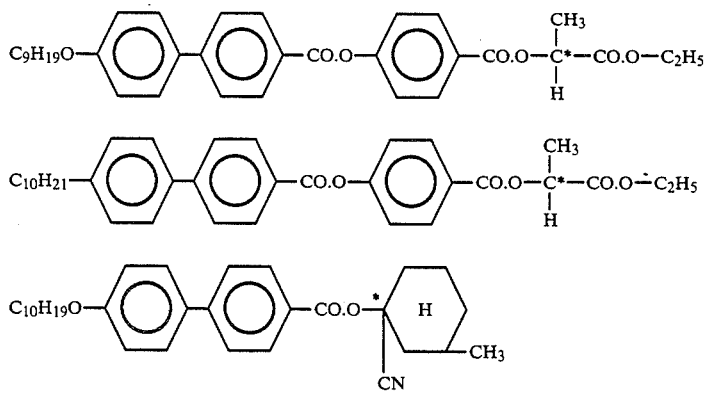

in the weight % proportions 44 : 45 : 11. The mixture is formed of constituents all exhibiting the same handedness, in this case left-handedness, in order to provide the mixture with a short pitch length. The proportion of the mote randomly oriented planar alignment at its major surfaces.

* * * * *